United States Patent [19]

Chang et al.

[11] Patent Number: 5,331,046
[45] Date of Patent: Jul. 19, 1994

[54] POLYOLEFINIC RESIN COMPOSITION HAVING SUPERIOR PAINTABILITY

[75] Inventors: Suk K. Chang; In S. Seo; Dae W. Hong, all of Daejeon, Rep. of Korea

[73] Assignee: Lucky Limited, Seoul, Rep. of Korea

[21] Appl. No.: 969,329

[22] Filed: Oct. 30, 1992

[30] Foreign Application Priority Data

Dec. 24, 1991 [KR] Rep. of Korea ............... 91-24290

[51] Int. Cl.$^5$ ............................................. C08L 51/06
[52] U.S. Cl. ................................. 525/71; 525/74; 525/78; 525/79; 525/80; 525/88; 525/89; 525/95; 525/98; 525/207; 525/221; 525/222; 524/423; 524/425; 524/504; 524/505
[58] Field of Search ............... 525/74, 78, 79, 80, 525/71, 70, 221, 222, 191, 88, 89, 98; 524/504, 505

[56] References Cited

U.S. PATENT DOCUMENTS

| | | | |
|---|---|---|---|
| 3,806,558 | 4/1974 | Fischer | 525/198 |
| 4,728,692 | 3/1988 | Sezaki et al. | 525/74 |
| 4,801,647 | 1/1989 | Wolfe | 525/74 |
| 4,829,125 | 5/1989 | Yeo et al. | 525/194 |
| 4,957,968 | 9/1990 | Ador et al. | 525/74 |
| 5,100,947 | 3/1992 | Poydak et al. | 525/74 |

FOREIGN PATENT DOCUMENTS 0312664 4/1989 European Pat. Off. .
123621 9/1989 Japan .
8807564 10/1988 World Int. Prop. O. .

*Primary Examiner*—James J. Seidleck
*Assistant Examiner*—M. L. Warzel
*Attorney, Agent, or Firm*—James D. Hall

[57] ABSTRACT

The present invention relates to a polyolefinic resin composition having superior paintability which comprises:

(A) 40 to 80 parts by weight of a crystalline polypropylene resin;

(B) 1 to 50 parts by weight of a thermoplastic olefinic rubber prepared by dynamic-crosslinking 10 to 70 parts by weight of a crystalline polypropylene resin with 90 to 30 parts by weight of an ethylene-α-olefin rubber;

(C) 0.5 to 30 parts by weight of a polypropylene resin modified by grafting a polar monomer which has a physical affinity, but is not reactive, with an ethylene copolymer or ethylene copolymer rubber modified with α,β-unsaturated carboxylic acid or a derivative thereof; and (D) 1 to 40 parts by weight of said modified ethylene copolymer or ethylene copolymer rubber based on 100 parts by weight of the total weight of the components (A),(B) and (C).

11 Claims, No Drawings

POLYOLEFINIC RESIN COMPOSITION HAVING SUPERIOR PAINTABILITY

FIELD OF THE INVENTION

The present invention relates to a polyolefinic resin composition having superior paintability; and, more specifically, to a polyolefinic resin composition which comprises a crystalline polypropylene resin, a thermoplastic olefinic rubber, a modified polypropylene resin and a modified ethylene copolymer or a modified ethylene copolymer rubber and is possessed with superior paintability, thereby forgoing the need to employ a primer in a-coating process.

BACKGROUND OF THE INVENTION

Olefinic resins, as well known in the art, have excellent moldability and good heat, solvent and chemical resistance; and, consequently, they enjoy a wide range of industrial applications, e.g., for the manufacture of automobile components. However, since they are chemically inactive owing to their non-polarity and have low solubility due to their high crystallinity, it is difficult to paint articles formed therefrom.

For instance, an automobile bumper made of an olefinic polymer or composition is normally coated with a polyurethane paint. However, in order to carry out the painting process, the molded articles should first undergo various surface treatments such as electric treatment, e.g., corona discharge treatment, plasma treatment and ultraviolet or electronic irradiation treatment, mechanical treatment, flame treatment and oxygen or ozone treatment before coating with a polyurethane paint. Needless to say, the above surface treatments are costly and time consuming.

Accordingly, in practice, the molded article, e.g., bumper, is coated with a primer and then applied with a polyurethane paint thereto. Since this method also requires extra cost and production time, search for a satisfactory solution has continued.

In an attempt to solve the problem, there have been suggested a process which comprises adding a rubber material and/or an inorganic filler and an ethylene copolymer containing a polar group to an olefinic resin(-see PCT International Publication No. WO 88/07 564); and, similarly, another process which comprises grafting an olefinic resin or a molded article thereof with a compound having a polar group in the presence of a peroxide(see JP 01 236 214 and EP 312,664). The former does not entail a significant improvement in its paintability, whereas the latter is not appropriate for a continuous production process due to various process requirements associated with the drying procedure and the dispersion and grafting of monomers. Accordingly, needs have continued to exist for the development of a polyolefinic composition which may be painted with a commercially available paint in a conventional coating process which is normally conducted at a temperature of 80° to 120° C.

SUMMARY OF THE INVENTION

The primary object of the present invention is, therefore, to develope a polyolefinic composition which has improved paintability and receptivity toward conventional paints, e.g., a polyurethane paint.

Unexpectedly, the present inventors have discovered that certain polyolefinic resin composition obtained in accordance with the present invention is possessed with superior paintability, impact strength and elastic recovery. Specifically, it has been found a polyolefinic resin composition which comprises: (A) a crystalline polypropylene resin; (B) a thermoplastic olefinic rubber prepared by dynamically crosslinking a polypropylene resin with an ethylene-α-olefin copolymer rubber; (C) a polypropylene resin modified by grafting a polar unsaturated monomer having a physical affinity with a modified ethylene copolymer or a modified ethylene copolymer rubber; and (D) an ethylene copolymer or an ethylene copolymer rubber which is modified with an unsaturated monomer having a functional group capable of firmly bonding with a paint composition.

In accordance with another aspect of the present invention, said polyolefinic resin composition may be made to impart a molded article thereof with a uniform receptivity to a coating composition throughout the entire surface of the molded article, by way of retaining a modified ethylene copolymer or a modified ethylene copolymer rubber on the surface layer of the molded article.

DETAILED DESCRIPTION OF THE INVENTION

Accordingly, the present invention relates to a polyolefinic resin composition which is receptive and adherent to, e.g., an automotive paint composition, thereby eliminating the need to employ a primer which would be otherwise needed to promote the receptivity. Specifically, the present invention relates to a polyolefinic resin composition which comprises:

(A) 40 to 80 parts by weight of a crystalline polypropylene resin;

(B) 1 to 50 parts by weight of a thermoplastic olefinic rubber prepared by dynamically crosslinking 10 to 70 parts by weight of a crystalline polypropylene resin with 90 to 30 parts by weight of an ethylene-α-olefin rubber;

(C) 0.5 to 30 parts by weight of a polypropylene resin modified by grafting a polar monomer which has a physical affinity, but is not reactive, with a modified ethylene copolymer or ethylene copolymer rubber mentioned in (D) below; and (D) 1 to 40 parts by weight of an ethylene copolymer or ethylene copolymer rubber which is modified with α,β-unsaturated carboxylic acid or a derivative thereof, based on 100 parts by weight of the total weight of the components (A), (B) and (C).

The crystalline polypropylene(A) used in the present invention may be a polypropylene homopolymer or a block or random copolymer with α-olefin monomer, which is crystalline due to its isotactic or syndiotactic structure. Preferably, polypropylene homopolymer and ethylene-propylene block or random copolymer are widely employed. However, a crystalline ethylene-propylene copolymer containing 20% or less of an ethylene or a mixture thereof may also be employed. Exemplary α-olefin monomers useful for the present invention include ethylene, 1-butene, 1-pentene, 4-methylpentene and 1-hexene.

The polypropylene resin may have a melt index(MI) of 0.1 to 100 g/10 min, preferably 0.5 to 80 g/10 min, more preferably 1.0 to 60 g/10 min, which is measured at a temperature of 230° C. under a load of 2160 g.

The thermoplastic olefinic rubber(B) may preferably possess a fixed phase structure to prevent or minimize the infiltration of the component(D) into the inner structure of the crosslinked rubber particles, and a sufficient crosslink density for the elastic recovery needed against shear force which may be created in, e.g., the injection molding of the molded article.

The thermoplastic olefinic rubber(B), as generally known in the art, can be prepared by melt-kneading such crosslinkable rubber as ethylene-propylene copolymer rubber or ethylene-propylene-non-conjugated diene terpolymer rubber and such non-crosslinkable component as crystalline polypropylene at a temperature of 180° to 250° C. under the exertion of a necessary level of shear force with a crosslinking agent, e.g., organic peroxide, sulfur or phenolic resin, preferably, an organic peroxide. The crosslink density of the thermoplastic olefinic rubber may preferably be in the range of 40 to 99% gel content, more preferably 70 to 98%. The gel content may be determined by measuring the content of solids undissoluble in cyclohexane or indirectly estimated from the increase rate of tensile strength at break and elongation.

The polypropylene of the component(A) may also be used in the preparation of the component(B). Ethylene-$\alpha$-olefin rubber used in the component(B) is preferably amorphous or of low crystalline; and capable of maintaining its elasticity during the crosslinking and melt processing; and, further, after molding, able to retain general physical properties such as impact strength, elastic recovery, etc.

The olefinic rubber comprises a non-conjugated diene to cause the crosslinking reaction with an organic peroxide. Representative dienes useful in the present invention include 1,4-hexadiene, dicyclopentadiene and ethylidene norbornene, which are able to control the crosslink density and cause the grafting with polypropylene and other unsaturated monomers.

In addition to the ethylene copolymer rubber, other cross-linkable rubbers comprising a crosslinkable polymer such as linear low density polyethylene, low density polyethylene, very-low density polyethylene, ethylene vinyl acetate or ethylene ethyl acrylate may also be used. The crosslinkable rubber should preferably be compatible with the component(D) and able to maintain elasticity in melting state. In light of these characteristics, styrene-butadiene block copolymer (SBC), styrene-butadiene-styrene block copolymer(SBS), styrene-ethylene-butylene-styrene block copolymer(SEBS) or styrene-ethylene-propylene-styrene block copolymer(SEPS) or a mixture thereof may be preferably employed.

A processing oil or a filler may be added so as to facilitate the preparation of the component(B) or to adjust the property thereof, and further, an ethylenic polymer may be mixed therewith to adjust the degree of crosslink and/or elasticity in melting state of the component(B).

The thermoplastic elastomer(B) having superior heat resistance and elastic recovery useful in the present invention can be prepared using a preblending method disclosed in U.S. Pat. No. 4,829,125. Specifically, the thermoplastic olefinic rubber(B) can be prepared by dynamically crosslinking 10 to 70 parts by weight of a crystalline polypropylene with 90 to 30 parts by weight of an ethylene-$\alpha$-olefin rubber. The component(B) may be used alone or in combination with two or more.

The component(C) is a polypropylene grafted with an unsaturated polar monomer which is not reactive but has a physical affinity with the polar group of the component(D). Exemplary compounds thereof may include an acrylic acid modified polypropylene, a maleic anhydride modified polypropylene and the like.

The modified polypropylene can be prepared by grafting the above unsaturated polar monomer with a radical initiator such as an organic peroxide. The polar monomer may be grafted at either a middle site or an end site of the polypropylene molecular chain, depending on the graft reaction condition. An unsaturated carboxylic acid or an anhydride thereof, e.g., acrylic acid and maleic anhydride, has been commercially employed in the grafting of polypropylene. For example, acrylic acid-grafted polypropylene wherein the acrylic acid is grafted in a content of 0.01 to 10 parts by weight is commercially available. The organic peroxide such as 1,3-bis(t-butyl) peroxy isopropylene benzene may be employed in an appropriate amount as an excess of organic peroxide tends to decompose the polypropylene resin and thereby reduce the molecular weight thereof. The graft reaction can be carried out in a polymerization reactor, an extruder or a Banbury kneader. The polypropylene useful in the graft reaction may also include the crystalline polypropylene resin of the component(A).

Exemplary polar unsaturated monomers include an unsaturated carboxylic acid, e.g., maleic acid, acrylic acid, methacrylic acid, fumaric acid or iraconic acid or a derivative thereof, e.g., maleic anhydride, itaconic anhydride, methyl acrylate, methyl methacrylate, acrylamide or maleimide.

The component(C) may be used alone or in combination with two or more. Care should be taken to avoid the use of polypropylene modified with a polar monomer which is reactive with a functional group of the component(D), because it may either exhaust the functional group which is necessary for the reaction with the paint composition or increase the viscosity of the product.

An ethylene copolymer or ethylene copolymer rubber which is modified with an unsaturated monomer such as $\alpha,\beta$-unsaturated carboxylic acid or a derivative thereof may be employed as the component(D). The component(D) can be prepared by either copolymerizing or grafting the ethylene polymer with the unsaturated polar monomer in accordance with the known graft copolymerization. The graft reaction is carried out in the presence of a radical initiator, e.g., organic peroxide. In addition, an ethylene copolymer or ethylene copolymer rubber having a functional group capable of firmly bonding with paints, e.g., alcohol group, tertiary amine, epoxy derivative, etc., may be also used as the component(D). Commercially available modified ethylene copolymers include ethylene-acrylic copolymer, ethylene-methacrylic copolymer, etc.

The ethylene copolymer rubbers which may be prepared by grafting $\alpha,\beta$-unsaturated carboxylic acid or a derivative thereof may include styrene-ethylene-propylene-styrene copolymer rubber(SEPS), hydrogenated styrene-ethylene-butylene-styrene copolymer rubber(SEBS) or ethylene-$\alpha$-olefin copolymer rubber wherein $\alpha$-olefin monomer may be propylene, 1-butene, 1-pentene or 1-hexene.

$\alpha,\beta$-unsaturated carboxylic acid or a derivative thereof employed for the modification includes an unsaturated carboxylic acid, e.g., acrylic acid, maleic acid, methacrylic acid or fumaric acid and an acid anhydride, ester, amide or imide thereof, e.g., maleic anhydride, methyl acrylate, acrylamide, maleimide etc., which may be used alone or in combination with two or more.

Among the monomers, a carboxylic acid or a maleic anhydride is preferably employed.

Representative commercially available modified ethylene copolymer rubbers are maleic anhydride-grafted ethylene-propylene copolymer rubber, maleic anhydride-grafted styrene-ethylene-butylene-styrene copolymer rubber, etc. In addition, there may be used any component which is flexible at a temperature of 80° to 120° C. or swellable by a cleaning solvent, a thinner and a paint solvent; is compatible with ethylene-α-olefin copolymer rubber having cross-linking structure; and has a functional group which is interactive with the paint composition. The component(D) may be employed in a mixture with a conventional ethylene copolymer in conformity with the purpose of the present invention.

Further, the present composition may comprise a filler or a reinforcement agent for lowering the cost and improving the heat resistance and the structural characteristics of the surface.

Suitable inorganic fillers which may be employed in the present invention include calcium carbonate, barium sulfate, talc, clay, mica, glass fiber, carbon fiber, wollastonite or kaolin; and are preferably employed in an amount of 40 parts by weight or less per 100 parts by weight of the total weight of the components (A),(B) and (C).

The present composition, if necessary, may contain various additives, e.g., antioxidant, ultraviolet absorbent, antistatic agent, weathering agent, lubricant, pigment, etc.

The components constituting the novel composition may be separately subjected to dry blending and thereafter can be simultaneously kneaded together. The kneading may be conducted with a Banbury mixer, co-kneader, roll mill, single-or twin-screw extruder, brabender, etc., at a temperature of 180° to 260° C., preferably 190° to 240° C.

The composition so produced can be molded by a conventional molding method which is commonly employed in the molding of polyolefin, e.g., injection, extrusion or blow molding.

As mentioned above, the molded product of the present composition is superior in paintability, printability and adhesion, eliminating the need to employ a pretreatment and/or a primer as normally required in coating a molded article made of an olefinic resin with a paint composition. In addition, the novel composition of the present invention possess excellent mechanical properties such as elastic recovery, heat resistance, impact resistance, elongation and moldability.

This invention is further described by way of the following examples which are given for the purpose of illustration and are not to be regarded as limiting the scope of the invention.

The physical properties of the compositions prepared in the examples and the comparative examples are determined in accordance with the following test conditions and methods; and the part specified in the examples is given by weight unless otherwise specified.
1. Tensile Strength: ASTM D-638
2. Flexural Modulus: ASTM D-790
3. Notched Izod Impact Strength: ASTM D-256(notched site: ⅛ inch of thickness)
4. Coat Peeling Strength(I): the number of unpeeled degrees when 10 mm×10 mm of a test piece was marked with 100 of check degrees using a razor blade; a cellophane tape was completely adhered thereto; and one end of the cellophane tape was peeled at right angles to a test piece.
5. Coat Peeling Strength(II): a value determined when the coat was peeled at an angle of 180° (g/cm) after forming 1 cm of a coat along the length on a surface.

The abbreviations and components employed in the present invention have the following meanings and properties:

PP: Polypropylene; ethylene content=8%, MI(230° C., 2160 g)=8 g/10 min

PP-1 and PP-2: Polypropylene(PP-1 is for pre-blending only); ethylene content=8%, MI(230° C., 2160 g)=2.5 g/10 min TPE-70E: Thermoplastic olefinic elastomer prepared by dynamic curing a preblend of EPDM/PP-1 and PP-2 in the presence of an organic peroxide under the shear stress; EPDM content=70% by weight EPDM: Ethylene-propylene-ethylidene norbornene terpolymer rubber; the content ratio of ethylene/propylene=65/35, ML 1+8(127° C.)=55, iodine value=10

Organic Peroxide: Perkadox 14-40(Akzo Chemical); the ratio of 1,3-bis (t-butyl)peroxy isopropylene benzene/$CaCO_3$=40/60

Crosslinking agent: Perkalink 301-50(Akzo Chemical); the ratio of triallyl isocyanurate/silica=50/50

EAA-1: Ethylene-acrylic acid random copolymer; MI(190° C., 2160 g)=300 g/10 min, content of acrylic cid=20% by weight EAA-2: Ethylene-acrylic acid random copolymer; MI(190° C., 2160 g)=12 g/10 min, content of acrylic acid=9.5% by weight EMAA: Ethylene-methacrylic acid random copolymer; MI(190° C., 2160 g)=25 g/10 min, content of methacrylic acid=10% by weight MAH-g-EPR=Maleic anhydride-grafted ethylene-propylene rubber; MI (230° C., 10,000 g)=7.8 g/10 min, content of maleic anhydride=1.5% by weight(Exxelor VA 1806, Exxon Chemical Company)

MAH-g-SEBS=Maleic anhydride-grafted styrene ethylene butylene styrene block copolymer; MI(230° C., 10,000 g)=40 g/10 min, content of maleic anhydride=2.0% by weight(Kraton FG 1901X, Shell Company)

AA-g-PP: Acrylic acid-grafted polypropylene; MI(230° C., 2160 g)=12 g/10 min, content of acrylic acid=6% by weight

EXAMPLE 1

A thermoplastic olefinic rubber was first prepared by using the following pre-blending method.

70 parts of EPDM and 10 parts of PP-1 were mixed for 10 minutes in a Banbury kneader which had been previously heated to 180° C. to form a pellet. 80 parts of a preblend of EPDM-PP-1 pellet was dry-blended with 20 parts of PP-2, 0.8 parts of organic peroxide (Perkadox 14-40) and 0.3 parts of crosslinking agent(Perkalink 301-50); and the blend so obtained was extruded on the co-kneader(Buss MDK/E-46) of which a barrel had a temperature of 200° to 240° C. to form a pellet(hereinafter referred to as TPE-70E).

50 parts of crystalline polypropylene(PP), 40 parts of TPE-70E, 5 parts of acrylic acid-modified polyethylene(EAA-1) and 10 parts of acrylic acid-modified polypropylene(AA-g-PP) were extruded on the co-kneader to form a pellet. The pellet so produced was molded at a temperature of 200° C. with an injection mold to form a test piece for determining various physical properties under ASTM.

In addition, the coat peeling test was conducted after treating the produced flat plate(80 mm×80 mm×3 mm) with trichloroethylene vapor at a temperature of 74° C. for 1 minute to clean it; coating the cleaned flat plate with a two-liquid type urethane paint consisting of polyol and isocyanate to a thickness of 50±10 μm; drying the coated flat plate at a temperature of 80° C. for 30 minutes; and leaving the dried flat plate for 3 days. The results of these tests are shown in Table 1.

EXAMPLES 2 TO 10

The same procedure as in Example 1 was repeated except that the contents of EAA-1, EAA-2 and AA-g-PP were changed as shown in Table 1. The results of the tests are shown in Table 1.

EXAMPLES 11 TO 14

The same procedure as in Example 1 was repeated except that the contents of TPE-70E, EAA-1 and PP-g-AA were changed as shown in Table 1. The results of the tests are shown in Table 1.

EXAMPLES 15 AND 16

The same procedure as in Example 1 was repeated except that the contents of EAA-1, EAA-2 and AA-g-PP were changed as shown in Table 1 and 20 parts of talc was added. The results of the tests are shown in Table 1.

EXAMPLES 17 TO 21

The same procedure as in Example 1 was repeated except that EMAA in the amount shown in Table 3 was used instead of EAA-1 and EAA-2, the content of AA-g-PP was changed as shown in Table 3 and 20 parts of talc was added. The results of the tests are shown in Table 3.

EXAMPLES 22 TO 27

The same procedure was repeated as in Example 1 except that MAH-g-SEBS and MAH-g-EPR in the amounts shown in Table 4 were used instead of EAA-1 and EAA-2, the contents of TPE-70E and AA-g-PP were changed as shown in Table 4 and 20 parts of talc was added. The results of the tests are shown in Table 4.

COMPARATIVE EXAMPLES 1 TO 5

The same procedure as in Example 1 was repeated except that the contents of EAA-1 and EAA-2 were changed as shown in Table 2 to observe the effects derived from the level of presence of EAA-1, EAA-2, talc and AA-g-PP. The results of the tests are shown in Table 2.

COMPARATIVE EXAMPLES 6 TO 8

The same procedure as in Example 1 was repeated except that EPDM was used instead of TPE-70E to observe the effect of EAA-1, EAA-2 and AA-g-PP vis-a-vis EPDM. The results of the tests are shown in Table 2.

COMPARATIVE EXAMPLES 9 TO 11

The same procedure as in Examples 17 to 21 was repeated except that the content of EMAA was reduced as shown in Table 3 and EPDM was used instead of TPE-70E to observe the effects derived from the level of presence of EMAA, AA-g-PP and the use of EPDM instead of TPE-70E. The results of the tests are shown in Table 3.

COMPARATIVE EXAMPLES 12 AND 13

The same procedure as in Examples 22 to 27 was repeated except that the contents of MAH-g-SEBS and MAH-g-EPR were reduced as shown in Table 4 to observe the amount reduction effect of MAH-g-SEBS and MAH-E-EPR. The results of the tests are shown in Table 4.

TABLE 1

|  | Example 1 | Example 2 | Example 3 | Example 4 | Example 5 | Example 6 | Example 7 | Example 8 |
|---|---|---|---|---|---|---|---|---|
| TPE - 70E | 40 | 40 | 40 | 40 | 40 | 40 | 40 | 40 |
| EAA - 1 | 5 | 10 | 20 | 10 | 10 | — | — | — |
| EAA - 2 | — | — | — | — | — | 5 | 10 | 20 |
| AA - g - PP | 10 | 10 | 10 | 2 | 20 | 10 | 10 | 10 |
| PP | 50 | 50 | 50 | 58 | 40 | 50 | 50 | 50 |
| Talc | — | — | — | — | — | — | — | — |
| Tensile Strength Kg/cm² (Yield Point) | 168 | 157 | 140 | 154 | 162 | 170 | 161 | 143 |
| Flexural Modulus (Kg/Cm²) | 7000 | 6200 | 4800 | 5900 | 6700 | 7200 | 6400 | 5000 |
| Notched Izod Impact Strength (Kg · Cm/Cm) Normal Temperature | NB* | NB | NB | NB | NB | NB | NB | NB |
| Notched Izod Impact Strength (Kg · Cm/Cm) −10° C. | NB | NB | NB | NB | NB | NB | NB | NB |
| Coat Peeling Strength (I) | 100/100 | 100/100 | 100/100 | 100/100 | 100/100 | 100/100 | 100/100 | 100/100 |
| Coat Peeling Strength (II) (g/Cm) | 660 | 980 | 1150 | 630 | 1060 | 520 | 810 | 1060 |

|  | Example 9 | Example 10 | Example 11 | Example 12 | Example 13 | Example 14 | Example 15 | Example 16 |
|---|---|---|---|---|---|---|---|---|
| TPE - 70E | 40 | 40 | 10 | 10 | 10 | 10 | 40 | 40 |
| EAA - 1 | — | — | 20 | 30 | 20 | 20 | 10 | 10 |
| EAA - 2 | 10 | 10 | — | — | — | — | — | — |
| AA - g - PP | 2 | 20 | 10 | 10 | 15 | 20 | 2 | 10 |
| PP | 58 | 40 | 80 | 80 | 75 | 70 | 58 | 50 |
| Talc | — | — | — | — | — | — | 20 | 20 |
| Tensile Strength Kg/cm (Yield Point) | 155 | 164 | 183 | 175 | 185 | 188 | 150 | 155 |
| Flexural Modulus (Kg/Cm²) | 6200 | 6900 | 8900 | 7700 | 9100 | 9400 | 9100 | 9500 |
| Notched Izod Impact Strength (Kg · Cm/Cm) Normal Temperature | NB | NB | NB | NB | NB | NB | NB | NB |
| Notched Izod Impact Strength (Kg · Cm/Cm) −10° C. | NB | NB | 10 | 15 | 10 | 8 | 18 | 16 |

TABLE 1-continued

| | | | | | | | | |
|---|---|---|---|---|---|---|---|---|
| Coat Peeling Strength (I) | 100/100 | 100/100 | 100/100 | 100/100 | 100/100 | 100/100 | 100/100 | 100/100 |
| Coat Peeling Strength (II) (g/Cm) | 520 | 840 | 430 | 520 | 580 | 690 | 710 | 1060 |

*NB means that the yest piece is not ruptured.

TABLE 2

| | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| EPDM | — | — | — | — | — | 30 | 30 | 30 |
| TPE - 70E | 40 | 40 | 40 | 40 | 40 | — | — | — |
| EAA - 1 | — | 10 | 0.5 | — | — | 10 | 10 | — |
| EAA - 2 | — | — | — | 0.5 | — | — | — | 10 |
| AA - g - PP | — | 0.1 | 10 | 10 | 10 | — | 10 | 10 |
| PP | 60 | 59.9 | 50 | 50 | 50 | 70 | 60 | 60 |
| Talc | — | — | — | — | 20 | — | — | — |
| Tensile Strength Kg/cm$^2$ (Yield Point) | 171 | 153 | 175 | 176 | 168 | 150 | 155 | 156 |
| Flexural Modulus (Kg/Cm$^2$) | 7300 | 6000 | 7600 | 7600 | 10200 | 6000 | 6300 | 6500 |
| Notched Izod Impact Strength (Kg · Cm/Cm) Normal Temperature | NB | NB | NB | NB | NB | NB | NB | NB |
| Notched Izod Impact Strength (Kg · Cm/Cm) −10° C. | NB | NB | NB | NB | 15 | NB | NB | NB |
| Coat Peeling Strength (I) | 0/100 | 35/100 | 0/100 | 0/100 | 0/100 | 0/100 | 0/100 | 0/100 |
| Coat Peeling Strength (II) (g/Cm) | 0 | 180 | 0 | 0 | 0 | 0 | 0 | 0 |

TABLE 3

| | Example 17 | Example 18 | Example 19 | Example 20 | Example 21 | Comparative Example 9 | Comparative Example 10 | Comparative Example 11 |
|---|---|---|---|---|---|---|---|---|
| TPE - 70E | 40 | 40 | 40 | 40 | 40 | 40 | 40 | — |
| EMAA | 10 | 20 | 10 | 10 | 10 | 10 | 0.5 | 10 |
| AA - g - PP | 10 | 10 | 2 | 20 | 10 | 0.1 | 10 | 10 |
| PP | 50 | 50 | 58 | 40 | 50 | 59.9 | 50 | 60 |
| Talc | — | — | — | — | 20 | — | — | — |
| EPDM | — | — | — | — | — | — | — | 30 |
| Tensile Strength Kg/cm$^2$ (Yield Point) | 160 | 142 | 155 | 164 | 176 | 158 | 177 | 156 |
| Flexural Modulus (Kg/Cm$^2$) | 6300 | 5000 | 6100 | 6900 | 9700 | 6200 | 7700 | 6500 |
| Notched Izod Impact Strength (Kg · Cm/Cm) Normal Temperature | NB | NB | NB | NB | NB | NB | NB | NB |
| Notched Izod Impact Strength (Kg · Cm/Cm) −10° C. | NB | NB | NB | NB | 17 | NB | NB | NB |
| Coat Peeling Strength (I) | 100/100 | 100/100 | 100/100 | 100/100 | 100/100 | 30/100 | 0/100 | 0/100 |
| Coat Peeling Strength (II) (g/Cm) | 880 | 1100 | 580 | 950 | 990 | 160 | 0 | 0 |

TABLE 4

| | Example 22 | Example 23 | Example 24 | Example 25 | Example 26 | Example 27 | Comparative Example 12 | Comparative Example 13 |
|---|---|---|---|---|---|---|---|---|
| TPE - 70E | 30 | 30 | 30 | 30 | 30 | 30 | 30 | 30 |
| MAH-g-SEBS | 10 | 20 | 10 | 10 | — | 10 | 0.5 | — |
| MAH-g-EPR | — | — | — | — | 20 | — | — | 0.5 |
| AA - g - PP | 10 | 10 | 2 | 20 | 10 | 10 | 10 | 10 |
| PP | 60 | 60 | 58 | 40 | 60 | 60 | 60 | 60 |
| Talc | — | — | — | — | — | 20 | — | — |
| Tensile Strength Kg/cm$^2$ (Yield Point) | 170 | 160 | 167 | 174 | 160 | 165 | 178 | 177 |
| Flexural Modulus (Kg/Cm$^2$) | 7300 | 6200 | 7000 | 7800 | 6000 | 10000 | 8200 | 8000 |
| Notched Izod Impact Strength (Kg · Cm/Cm) Normal Temperature | NB | NB | NB | NB | NB | NB | NB | NB |
| Notched Izod Impact Strength (Kg · Cm/Cm) −30° C. | NB | NB | NB | NB | NB | 10 | 18 | 21 |
| Coat Peeling Strength (I) | 100/100 | 100/100 | 100/100 | 100/100 | 100/100 | 100/100 | 0/100 | 0/100 |
| Coat Peeling Strength (II) (g/Cm) | 900 | 1150 | 680 | 1000 | 900 | 1000 | 0 | 0 |

While the invention has been described with respect to the above specific embodiments, it should be recognized that various modifications and changes which may be apparent to those skilled in the art to which the invention pertains may be made and also fall within the scope of the invention as defined by the claims that follow.

What is claimed is:

1. A polyolefinic resin composition which comprises:

(A) 40 to 80 parts by weight of a crystalline polypropylene resin;

(B) 1 to 50 parts by weight of a thermoplastic olefinic rubber prepared by dynamically crosslinking 10 to 70 parts by weight of a crystalline polypropylene resin with 90 to 30 parts by weight of an ethylene-α-olefin rubber;

(C) 0.5 to 30 parts by weight of a polypropylene resin modified by grafting a polar monomer which has a physical affinity, but is not reactive, with an ethylene copolymer or ethylene copolymer rubber modified with α,β-unsaturated carboxylic acid or a derivative thereof; and (D) 1 to 40 parts by weight of said modified ethylene copolymer or ethylene copolymer rubber based on 100 parts by weight of the total weight of the components (A), (B) and (C).

2. The composition of claim 1 wherein the crystalline polypropylene resin(A) is polypropylene homopolymer, ethylene-propylene block or random copolymer containing 20% or less of an ethylene or a mixture thereof.

3. The composition of claim 1 wherein the crosslink density of the component(B) is in the range of 40 to 99% gel content.

4. The composition of claim 1 wherein said ethylene-α-olefin rubber used in the preparation of the component (B) is ethylene-propylene copolymer rubber or ethylene-propylene non-conjugated diene terpolymer rubber.

5. The composition of claim 1 wherein the component(C) is acrylic acid-modified polypropylene or maleic anhydride-modified polypropylene.

6. The composition of claim 1 wherein said α,β-unsaturated carboxylic acid or a derivative thereof is maleic, acrylic, methacrylic, fumaric or itaconic acid, maleic or itaconic anhydride, methyl acrylate, methyl methacrylate, acrylamide, maleic monoamide, maleimide, N-butylmaleimide, hydroxyethyl methacrylate, dimethylaminoethyl methacrylate or glycidyl methacrylate.

7. The composition of claim 1 wherein the modified ethylene copolymer(D) is ethylene-acrylic copolymer or ethylene-methacrylic copolymer.

8. The composition of claim 1 wherein said ethylene copolymer rubber of the modified ethylene copolymer rubber(D) is ethylene-α-olefin copolymer rubber, styrene-ethylene-butylene-styrene block copolymer rubber or styrene-ethylene-propylene-styrene block copolymer rubber.

9. The composition of claim 1 or 8 wherein the modified ethylene copolymer rubber(D) is maleic anhydride-grafted styrene-ethylene-butylene-styrene block copolymer rubber or maleic anhydride-grafted ethylene propylene copolymer rubber.

10. The composition of claim 1 wherein the composition further comprises 40 parts by weight or less of an inorganic filler per 100 parts by weight of the total weight of the components (A), (B) and (C).

11. The composition of claim 10 wherein the inorganic filler is calcium carbonate, barium sulfate, talc, clay, mica, glass fiber, carbon fiber, wollastonite or kaolin.

* * * * *